(12) United States Patent
Onishi et al.

(10) Patent No.: US 11,387,743 B2
(45) Date of Patent: Jul. 12, 2022

(54) POWER SUPPLY DEVICE AND CONTROL METHOD FOR STABLY OPERATING A DEVICE WHEN A FREQUENCY OF AN INPUT POWER SUPPLY FLUCTUATES

(71) Applicant: Panasonic Intellectual Property Management Co., Ltd., Osaka (JP)

(72) Inventors: Haruka Onishi, Osaka (JP); Teruhisa Murashima, Osaka (JP); Katsutoshi Sumida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 19 days.

(21) Appl. No.: 16/631,641

(22) PCT Filed: Feb. 19, 2018

(86) PCT No.: PCT/JP2018/005647
§ 371 (c)(1),
(2) Date: Jan. 16, 2020

(87) PCT Pub. No.: WO2019/016990
PCT Pub. Date: Jan. 24, 2019

(65) Prior Publication Data
US 2020/0204084 A1 Jun. 25, 2020

(30) Foreign Application Priority Data

Jul. 20, 2017 (JP) .............................. JP2017-140519

(51) Int. Cl.
*H02M 7/06* (2006.01)
*H02J 3/38* (2006.01)
*H02M 1/00* (2006.01)

(52) U.S. Cl.
CPC .............. *H02M 7/06* (2013.01); *H02J 3/381* (2013.01); *H02J 2300/28* (2020.01); *H02M 1/0009* (2021.05)

(58) Field of Classification Search
CPC ..................... H02M 3/335–337; H02M 7/06
See application file for complete search history.

(56) References Cited

U.S. PATENT DOCUMENTS 3,201,597 A * 8/1965 Balan ................. H02M 1/081
  315/DIG. 3
RE26,119 E * 12/1966 Slater ...................... A01B 3/42
  315/DIG. 3

(Continued)

FOREIGN PATENT DOCUMENTS

JP   H06276744   * 9/1994
JP   2003-339164   11/2003

(Continued)

OTHER PUBLICATIONS

International Search Report dated May 1, 2018 in International (PCT) Application No. PCT/JP2018/005647.

*Primary Examiner* — Thienvu V Tran
*Assistant Examiner* — Nusrat Quddus
(74) *Attorney, Agent, or Firm* — Wenderoth, Lind & Ponack L.L.P.

(57) ABSTRACT

A power supply device is configured with input terminal (11) connectable to AC power supply (1) whose power supply frequency fluctuates, rectifier (12) that rectifies an AC voltage applied to power input terminal (11), frequency detector (13) that measures frequency of rectifier (12), current limiter (14) that regulates current output from rectifier (12), charge accumulation unit (15) that accumulates charge output from current limiter (14), current detector (16) that measures current output from charge accumulation unit (15), load connection terminal (17) connectable to load (20) that is (Continued)

operated by current output from current detector (16), and controller (18) that controls a regulated value of current limiter (14) and capacitance of charge accumulation unit (15) in accordance with fluctuation of the frequency measured by frequency detector (13) in such a manner that the current output from charge accumulation unit (15) becomes larger than current consumed by load (20) at a predetermined time.

10 Claims, 6 Drawing Sheets

(56) References Cited

U.S. PATENT DOCUMENTS

| | | | | |
|---|---|---|---|---|
| 4,719,404 | A * | 1/1988 | Ekstrand | H02M 7/219 323/224 |
| 5,737,207 | A * | 4/1998 | Uratani | H05B 41/2827 363/132 |
| 8,743,576 | B2 * | 6/2014 | Sasaki | H02M 1/4225 363/89 |
| 9,281,758 | B1 * | 3/2016 | Wang | H02H 9/001 |
| 2002/0027787 | A1 * | 3/2002 | Nishida | H02M 3/3385 363/21.16 |
| 2004/0066661 | A1 | 4/2004 | Nakajima et al. | |
| 2007/0058400 | A1 | 3/2007 | Kimura et al. | |
| 2009/0200983 | A1 * | 8/2009 | Dyer | H02K 7/1876 320/107 |
| 2010/0118573 | A1 * | 5/2010 | Saint-Pierre | H02M 1/4225 363/126 |
| 2010/0213858 | A1 * | 8/2010 | Kuroki | H05B 45/3725 315/210 |
| 2011/0101877 | A1 * | 5/2011 | Zhan | H05B 45/385 315/206 |
| 2011/0222318 | A1 | 9/2011 | Uno et al. | |
| 2012/0008348 | A1 * | 1/2012 | Chapman | H02M 7/53871 363/37 |
| 2012/0025806 | A1 * | 2/2012 | Chui | G01R 19/2506 324/76.11 |
| 2012/0026761 | A1 * | 2/2012 | Young | H05B 31/50 318/494 |
| 2012/0229044 | A1 * | 9/2012 | Nerone | H05B 45/38 315/210 |
| 2012/0235585 | A1 * | 9/2012 | Lys | H05B 39/044 702/66 |
| 2012/0262950 | A1 | 10/2012 | Nate et al. | |
| 2012/0286681 | A1 * | 11/2012 | Hausman, Jr. | H05B 45/10 315/307 |
| 2013/0181624 | A1 * | 7/2013 | Kang | H05B 45/382 315/307 |
| 2013/0249437 | A1 * | 9/2013 | Wang | H05B 45/31 315/307 |
| 2014/0063865 | A1 | 3/2014 | Nate | |
| 2014/0203717 | A1 * | 7/2014 | Zhang | H05B 45/3578 315/188 |
| 2016/0072447 | A1 * | 3/2016 | Seth | H03F 1/0233 330/259 |
| 2016/0118900 | A1 | 4/2016 | Nate et al. | |
| 2016/0241135 | A1 * | 8/2016 | Zhao | H02M 1/44 |
| 2016/0266189 | A1 * | 9/2016 | Yoshida | G01R 31/64 |
| 2016/0359422 | A1 * | 12/2016 | Yuan | G01R 31/42 |
| 2017/0040900 | A1 * | 2/2017 | Vaughan | G01R 23/155 |
| 2017/0099004 | A1 * | 4/2017 | Nishijima | H02M 3/33523 |

FOREIGN PATENT DOCUMENTS

| | | |
|---|---|---|
| JP | 2011-188632 | 9/2011 |
| JP | 2014-27819 | 2/2014 |
| JP | 2015-133907 | 7/2015 |

* cited by examiner

POWER SUPPLY DEVICE AND CONTROL METHOD FOR STABLY OPERATING A DEVICE WHEN A FREQUENCY OF AN INPUT POWER SUPPLY FLUCTUATES

TECHNICAL FIELD

The present disclosure relates to a power supply device and a control method capable of stably operating a device even when frequency of an input power supply fluctuates.

BACKGROUND ART

PTL 1 discloses a switching power supply device low in cost and high in efficiency. The power supply device does not use a pulse transformer, a drive transformer, and a photo coupler, and includes a primary digital control circuit and a secondary digital control circuit. This enables to eliminate transformer size problem, photocoupler response problem, and aging problem.

CITATION LIST

Patent Literature

PTL 1: Unexamined Japanese Patent Publication No. 2011-188632

SUMMARY OF THE INVENTION

However, a conventional power supply device may disadvantageously fail to start a device or make operation of the device unstable when frequency of primary power supply is fluctuated.

The present disclosure has been conceived to solve the conventional problem, and aims to provide a power supply device and a control method useful for stably operating a device even when frequency of a primary power supply fluctuates.

A power supply device according to an aspect of the present disclosure includes a power input terminal connectable to an alternating current (AC) power supply whose power supply frequency fluctuates, a rectifier that rectifies an AC voltage applied to the power input terminal, a frequency detector that measures frequency of the rectifier, a current limiter that regulates current output from the rectifier, a charge accumulation unit that accumulates charge output from the current limiter, a current detector that measures current output from the charge accumulation unit, a load connection terminal connectable to a load that is operated by current output from the current detector, and a controller that controls a regulated value of the current limiter and capacitance of the charge accumulation unit in accordance with fluctuation of the frequency measured by the frequency detector, in such a manner that the current output from the charge accumulation unit becomes larger than current consumed by the load at a predetermined time.

The power supply device according to the aspect of the present disclosure can provide a power supply device preferably applicable to an electronic device using an input power supply whose frequency can be fluctuated.

DESCRIPTION OF EMBODIMENT

Hereinafter, an exemplary embodiment will be described with reference to the drawings as appropriate. Note that detailed description more than necessary may be omitted. For example, a detailed description of well-known matters and a duplicate description of substantially identical configurations may be omitted. This is to avoid unnecessary redundancy in the following description and to make the following description easily understandable to those skilled in the art.

Note that the attached drawings and the following description are provided for those skilled in the art to fully understand the present disclosure, and are not intended to limit the subject matter as described in the appended claims.

First Exemplary Embodiment

Hereinafter, a first exemplary embodiment of the present disclosure will be described with reference to FIGS. 1 to 6.
[1-1. Configuration]
FIG. 1 is a block diagram illustrating a configuration of a power supply device according to the first exemplary embodiment.

Figure 1:
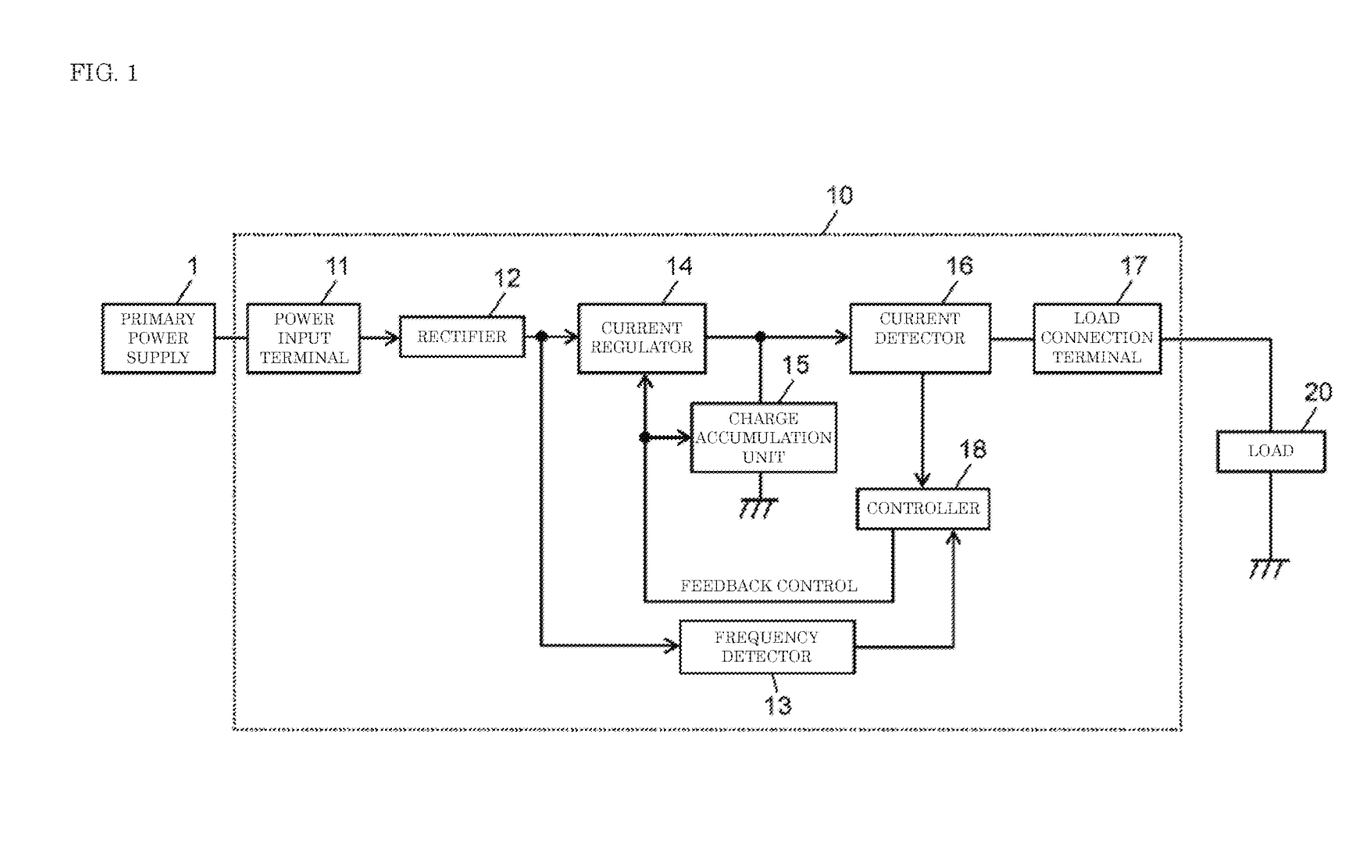
FIG. 1 is a block diagram illustrating a configuration of a power supply device according to a first exemplary embodiment.

Power supply device 10 illustrated in FIG. 1 is provided inside an electronic device such as a display. Power supply device 10 includes power input terminal 11, rectifier 12, frequency detector 13, current limiter 14, charge accumulation unit 15, current detector 16, and load connection terminal 17.

Power input terminal 11 is a device capable of receiving power-supply voltage such as an AC inlet. Electric power is supplied to power supply device 10 via power input terminal 11 when power input terminal 11 is connected to primary power supply 1 (AC power supply). Herein, frequency of primary power supply 1 is fluctuated arbitrarily. That is, power input terminal 11 can be connected to a plurality of primary power supplies different in frequency. For example, power input terminal 11 is selectively connected to a primary power supply (commercial power supply) of 60 Hz frequency, and a primary power supply of 400 Hz frequency (an AC power supply providing frequency different from frequency of the commercial power supply). Alternatively, power input terminal 11 may be connected to a single primary power supply capable of changing frequency. For example, power input terminal 11 may receive AC power supply from a renewable energy generator such as a wind-power generator.

Rectifier 12 is a device that rectifies AC waveform such as a bridge diode, and rectifies AC voltage input to power input terminal 11.

Frequency detector 13 is a device that converts frequency information into another value (voltage value in this case) as appropriate and notifies a later stage of the frequency information such as a frequency-voltage converter (V-F converter). Frequency detector 13 detects output frequency of rectifier 12, and notifies controller 18 of frequency information detected. When controller 18 can directly read-out frequency, the conversion function is not necessary. Note that, although a configuration is illustrated in which output frequency of rectifier 12 is detected by frequency detector 13, a configuration may be employed in which input frequency of rectifier 12 is detected by frequency detector 13. That is, frequency detector 13 detects frequency of rectifier 12. Specifically, the frequency is frequency of input voltage or input current to rectifier 12, or frequency of output voltage or output current from rectifier 12.

Current limiter 14 is a variable resistor (resistance element) capable of being set to any resistance value, for example. Current limiter 14 regulates a current value of output current of current rectifier 12 on the basis of the resistance value (regulated value) set.

Charge accumulation unit 15 is a variable capacitor capable of being set to any capacitance, for example. Charge accumulation unit 15 accumulates output charge of limiter regulator 14 on the basis of the capacitance set.

Current detector 16 is an element or a device for measuring current such as a sense resistor, for example. Current detector 16 measures a value of current supplied to load 20 via load connection terminal 17 from charge accumulation unit 15, and notifies controller 18 of current information indicating the value of current measured. Note that examples of load 20 include a light-emitting diode (LED) and a DC fan. Load 20 operates by receiving output current of current detector 16.

Controller 18 is, for example, an element capable of simultaneously processing a plurality of commands like a small microcontroller. Controller 18 performs feedback control of the resistance value of current limiter 14 and the capacitance of charge accumulation unit 15 on the basis of the frequency information output from frequency detector 13 and the current information output from current detector 16. Specifically, controller 18 makes charge accumulated in charge accumulation unit 15 larger than current (current consumption of load 20) supplied to load 20 at a predetermined time by the feedback control.

Herein, communication time and feedback time occurred in frequency detector 13, current detector 16, and controller 18 shall be negligibly small. Likewise, a time for current limiter 14 and charge accumulation unit 15 to follow a target value from receiving the control from controller 18 shall be negligibly small. Furthermore, change of current of load 20 connected via load connection terminal 17 shall be sufficiently small in frequency than frequency fluctuation of power input terminal 11.

[1-2. Operation]

Figure 2:
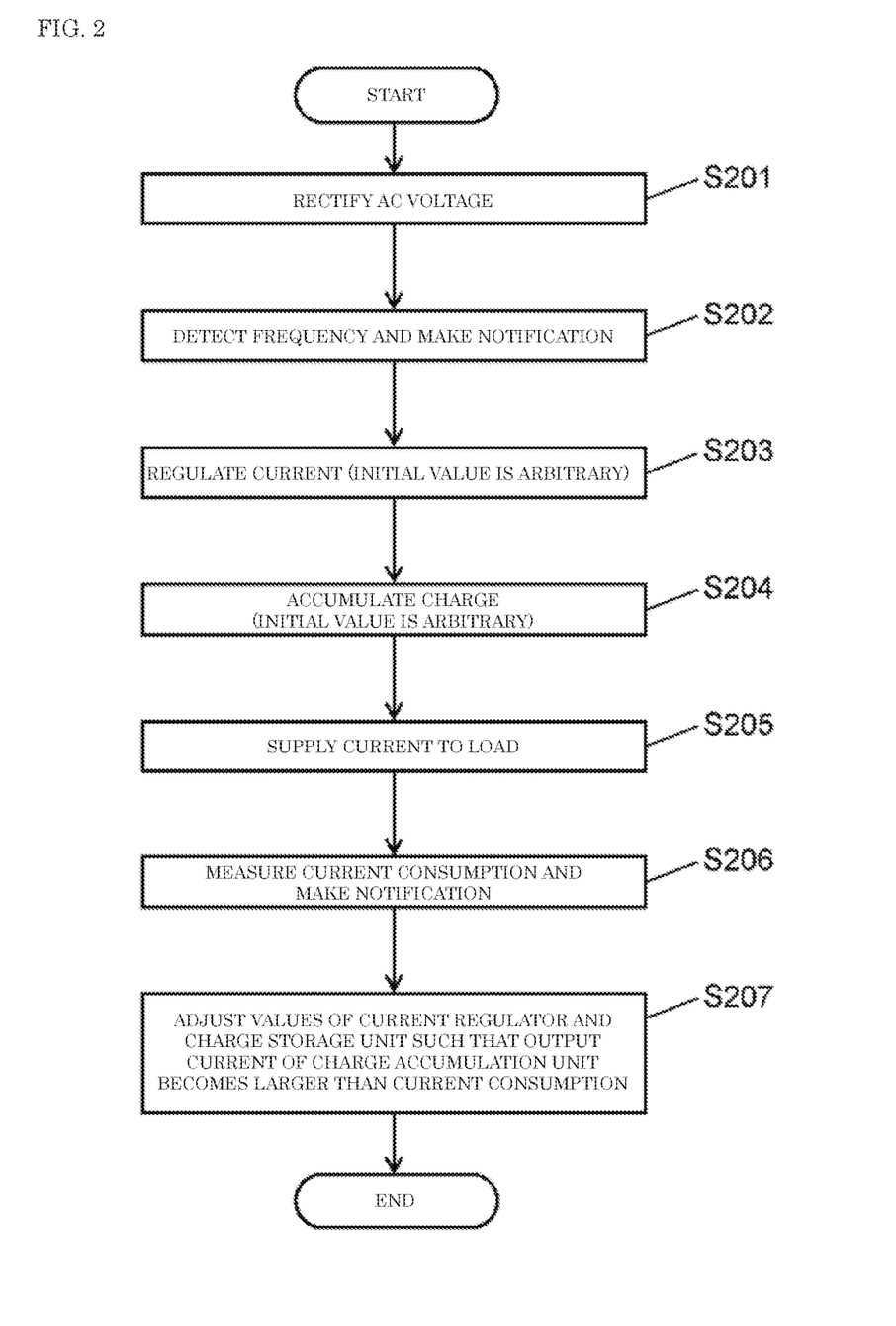
FIG. 2 is a diagram illustrating a flowchart for illustrating an operation of the power supply device according to the first exemplary embodiment.
Figure 3:
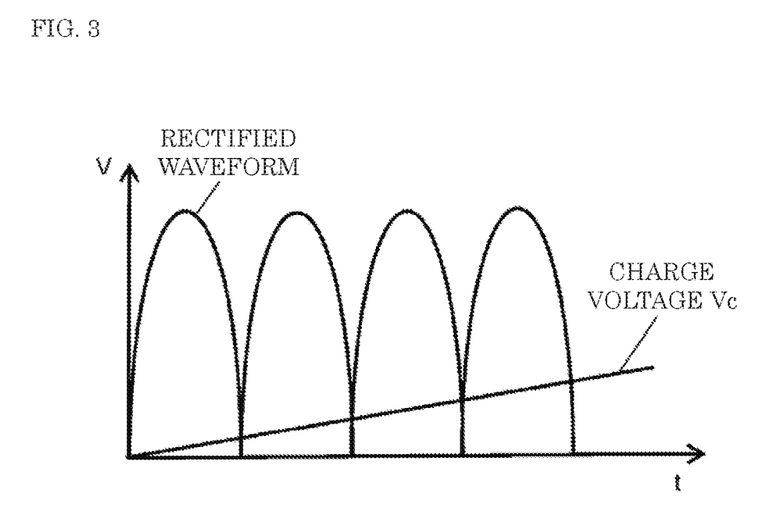
FIG. 3 is a diagram illustrating an example of output waveform of a rectifier and charge voltage Vc of a charge accumulation unit in the first exemplary embodiment.
Figure 4:
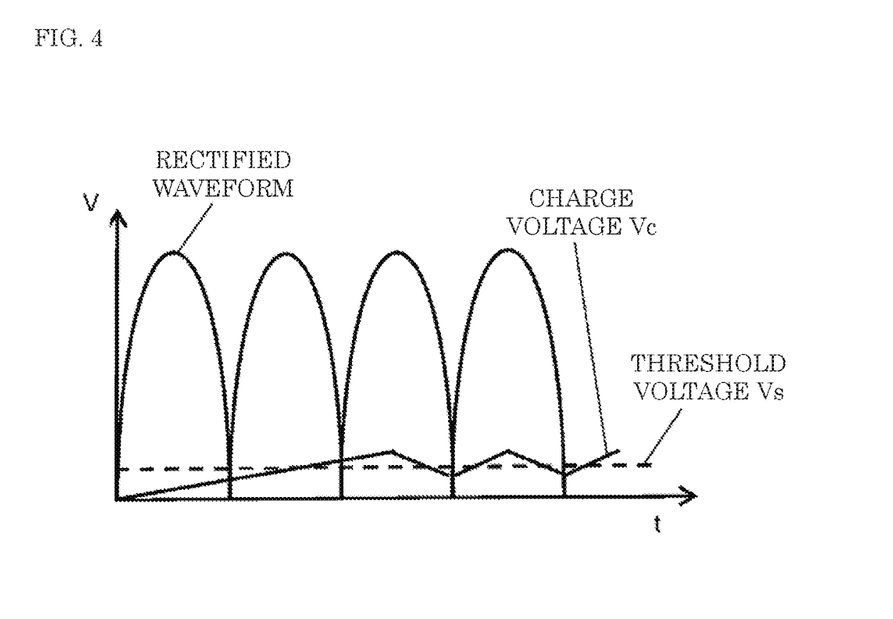
FIG. 4 is a diagram illustrating an example of charge voltage Vc of the charge accumulation unit in a case where current is supplied to a load.
Figure 5:
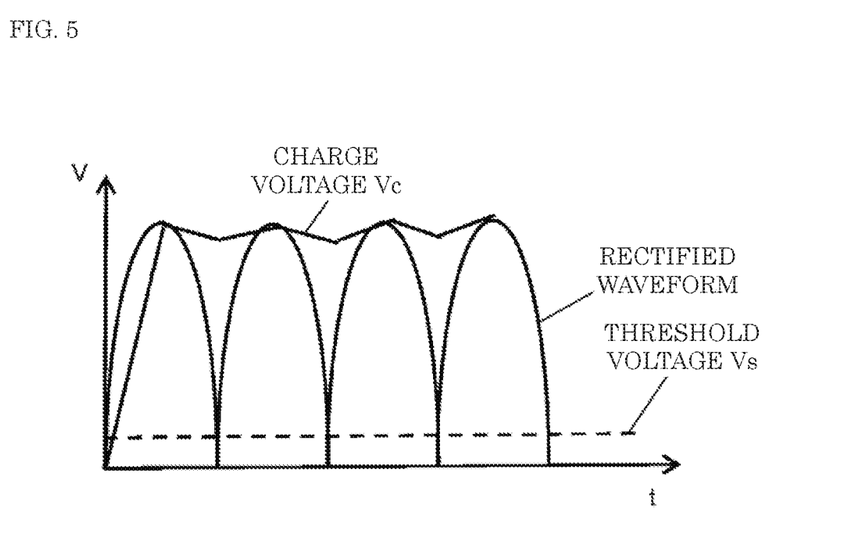
FIG. 5 is a diagram illustrating an example of charge voltage Vc of the charge accumulation unit in a case where current is supplied to a load.
Figure 6:
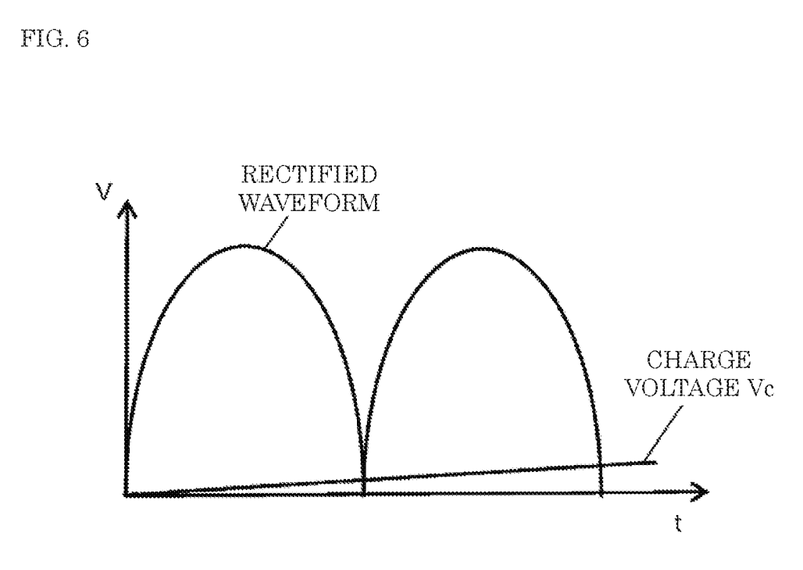
FIG. 6 is a diagram illustrating an example of charge voltage Vc of charge accumulation unit 15 in a case where frequency of a primary power supply becomes low in the first exemplary embodiment.

FIG. 2 is a flowchart illustrating an operation of the power supply device according to the first exemplary embodiment. FIG. 3 is a diagram illustrating an example of output waveform of rectifier 12 and charge voltage Vc of charge accumulation unit 15 according to the first exemplary embodiment. Also, FIG. 4 is a diagram illustrating an example of charge voltage Vc of charge accumulation unit 15 in a case where current is supplied to load 20. Likewise, FIG. 5 is a diagram illustrating an example of charge voltage Vc of charge accumulation unit 15 in a case where current is supplied to load 20. Also, FIG. 6 is a diagram illustrating an example of charge voltage Vc of charge accumulation unit 15 in a case where frequency of primary power supply 1 becomes lower than frequency in FIG. 3 in the first exemplary embodiment.

First, power supply device 10 starts processing illustrated in FIG. 2 when power input terminal 11 is connected to primary power supply 1.

Next, rectifier 12 rectifies AC voltage input to power input terminal 11 (step S201). FIG. 3 illustrates an example of a waveform (curve line) rectified by rectifier 12.

Next, frequency detector 13 detects output frequency of rectifier 12, and notifies controller 18 of frequency information indicating the output frequency detected (step S202). Frequency detector 13 may periodically detect frequency at predetermined time intervals, or may detect frequency only at a timing where power input terminal 11 is connected to primary power supply 1.

Next, current limiter 14 regulates a current value of output current of rectifier 12 on the basis of a resistance value (regulated value) set (step S203). Note that an initial value of the resistance value is arbitrarily set. The resistance value after starting operation can be variably set by controller 18.

Next, upon receiving output charge of current limiter 14, charge accumulation unit 15 accumulates charge C on the basis of capacitance set (step S204). Note that an initial value of the capacitance is arbitrarily set. The capacitance after starting operation can be variably set by controller 18. FIG. 3 is a diagram illustrating an example of rectified waveform regulated in current by current limiter 14 and waveform (straight line) of voltage at which charge accumulation unit 15 is charged. Herein, an inclination (charged amount) of the waveform of the charged voltage (charge voltage Vc) is changed by the resistance value (regulated value) of current limiter 14 and a value of capacitance of charge accumulation unit 15.

Next, charge accumulation unit 15 supplies current to load 20 via load connection terminal 17 (step S205).

In FIG. 4, a dotted line illustrates threshold voltage Vs at which load 20 is appropriately operable. In this example, although charge voltage Vc illustrated by a solid line once exceeds threshold voltage Vs, charge voltage Vc immediately falls below threshold value Vs by supply of current to load 20. Although charge voltage Vc exceeds threshold value Vs again after charging for a while, when supply of current to load 20 continues, charge voltage Vc falls below threshold voltage Vs again. In this manner, when the resistance value (regulated value) of current limiter 14 and the capacitance of charge accumulation unit 15 are not adequately adjusted, load 20 may not be appropriately operated. Therefore, as described below in detail, controller 18 controls the resistance value of current limiter 14 and the capacitance of charge accumulation unit 15 on the basis of frequency information and current information.

Next, current detector 16 measures a value of current supplied to load 20 from charge accumulation unit 15 via load connection terminal 17, that is, current consumption of load 20, and notifies controller 18 of the value of current measured (step S206).

Next, controller 18 adjusts the resistance value of current limiter 14 and the capacitance of charge accumulation unit 15 on the basis of frequency information output from frequency detector 13 and current information output from current detector 16 (step S207). Specifically, controller 18 makes charge to be accumulated in charge accumulation unit 15 larger than current supplied to load 20 (current consumed by load 20) at a predetermined time. Charge accumulation unit 15 supplies output current to load 20 by discharging charge accumulated in charge accumulation unit 15. Load 20 operates by the output current supplied from charge accumulation unit 15. The predetermined time is a period while load 20 operates, that is, while load 20 consumes current.

Herein, an adjustment method of the resistance value of current limiter 14 and the capacitance of charge accumulation unit 15 will be specifically described using case (1) when current consumption is increased, and case (2) when frequency of an input power supply is decreased as two examples.

First, case (1) will be described. Increase of current consumption needs to store more charge in charge accumulation unit 15 to supply more current to the load. Accordingly, in accordance with a predetermined algorithm, controller 18 derives a range of the resistance value of current limiter 14 (hereinafter, referred to as R) and the capacitance of charge accumulation unit 15 (hereinafter, referred to as C) on the basis of the current information notified from current detector 16 and the frequency information notified from frequency detector 13. For example, the range can be described like R×C>α. Controller 18 adjusts values of R and C from this range. This enables to continue operation of load 20 even when current consumption is increased.

Next, case (2) will be described. As illustrated in FIG. 6, when the frequency of the input power supply (primary power supply 1) is decreased, accumulation of charge voltage Vc slows down unless the resistance value of current limiter 14 and the capacitance of charge accumulation unit 15 are not changed. Therefore, controller 18 calculates the range of values of R and C on the basis of the frequency information notified from frequency detector 13 and the current information notified from current detector 16. Like in the example of above-mentioned (1), the range can be described like R×C>ß.

In the examples of above-mentioned (1) and (2), R and C are any variables. A user can freely set the selection range of R and C. The user can also intentionally bias the selection range of R and C. That is, the user can intentionally narrow the selection range of one of R and C, and thus intentionally broaden the selection range of the other one of R and C. For example, when an operation threshold of a breaker of primary power supply 1 is set to be a smaller value, increasing C makes the breaker readily operate. In this case, in order to prevent the breaker from malfunctioning, C is made to be less than or equal to a predetermined value and R is preferentially adjusted (that is, adjusted in a wide range), which makes handling possible.

Also, in the examples of above mentioned (1) and (2), although R and C shall be variables, one of them may be a fixed value. In this case, the value is uniquely determined like R=η for example.

As illustrated in FIG. 5, appropriately setting the resistance value of current limiter 14 and the capacitance of charge accumulation unit 15 enables to stably operate load 20. In contrast, when resistance value of current limiter 14 and capacitance of charge accumulation unit 15 are inadequate, charge voltage Vc remains near threshold voltage Vs as illustrated in FIG. 4.

The above-mentioned processes of steps S201 to S207 are continuously performed while power input terminal 11 is connected to primary power supply 1, and ended when that power input terminal 11 is not connected to primary power supply 1 is detected.

Note that initial values of R and C shall be any values, and controller 18 shall be capable of performing feedback control at a speed at which effect of the initial values can be ignored.

[1-3. Effects and Others]

As described above, in the present exemplary embodiment, power supply device 10 includes power input terminal 11 connectable to primary power supply 1 whose power supply frequency fluctuates, rectifier 12 that rectifies an AC voltage applied to power input terminal 11, frequency detector 13 that measures frequency of rectifier 12, current limiter 14 that regulates current output from rectifier 12, charge accumulation unit 15 that accumulates charge output from current limiter 14, current detector 16 that measures current output from charge accumulation unit 15, load connection terminal 17 connectable to load 20 operated by current output from current detector 16, and controller 18 that controls a regulated value of current limiter 14 and capacitance of charge accumulation unit 15 in accordance with fluctuation of the frequency measured by frequency detector 13 in such a manner that the current output from charge accumulation unit 15 becomes larger than current consumed by load 20 at a predetermined time.

This enables power supply device 10 to stably operate load 20 without shortage of current supply to load 20 even when frequency of primary power supply 1 fluctuates.

For example, the frequency of primary power supply 1 is 400 Hz in an airplane. An electronic device such as a seat monitor driven by primary power supply 1 is designed on a premise of being operated by receiving power from a power supply of 400 Hz, and operation is not guaranteed by receiving power from a power supply of another frequency. Accordingly, the electronic device does not operate by commercial power supply of 50 Hz or 60 Hz when the electronic device once mounted on an airframe is removed on the ground for failure analysis. Accordingly, preparation of a dedicated power supply that generates electric power of 400 Hz, or remodeling of the electronic device to be operated with commercial power supply is required. However, stable operation of such an electronic device can be expected regardless of a value of frequency of a primary power supply by applying the power supply device according to the present disclosure to the electronic device. In this manner, the power supply device of the present disclosure is useful for an electronic device operated with frequency different from frequency of a commercial power supply.

Also, for example, in wind-power generation, when strength of wind, that is, a number of revolutions of a windmill fluctuates, frequency of output voltage fluctuates. This may disadvantageously cause adverse effect to stable operation of an electronic device connected to wind-power generation equipment. However, by applying the power supply device according to the present disclosure, stable operation can be expected of the electronic device driven by a power supply whose frequency fluctuates such as wind-power generation.

Also, for example, when a commercial power supply of new frequency opens in an area where power supply is not currently opened or the like, development of an AC adaptor compatible with existing power supply equipment may be needed. Specifically, power supply frequency in the world is currently 50 Hz or 60 Hz, but power supply using a frequency other than these frequencies may be employed in the future. In this case, stable operation is not guaranteed for an AC adaptor for 50 Hz or 60 Hz currently used. In such a case, adopting the power supply device according to the present disclosure to an AC adaptor enables to deal with any frequency.

Note that, the above-mentioned exemplary embodiment has been described to exemplify the technology according to the present disclosure, and therefore, various modifications, replacements, additions, and omissions may be made within the scope of the claims.

INDUSTRIAL APPLICABILITY

The present disclosure is applicable to AC power supply equipment that may fluctuate in frequency. Specifically, the present disclosure is applicable to equipment assumed to be used under frequency fluctuation such as electronic device using wind-power generation or motor power generation as an input power source.

REFERENCE MARKS IN THE DRAWINGS

1: primary power supply
11: power input terminal
12: rectifier
13: frequency detector
14: current limiter
15: charge accumulation unit
16: current detector
17: load connection terminal
18: controller
20: load

The invention claimed is:

1. A power supply device comprising:
a power input terminal connectable to an alternating current (AC) power supply whose power supply frequency fluctuates;
a rectifier that rectifies an AC voltage applied to the power input terminal;
a frequency detector that measures a frequency of the rectifier;
a variable resistor that regulates current output from the rectifier, the variable resistor having a variable resistance;
a charge accumulation unit that accumulates charge output from the variable resistor, the charge accumulation unit including a variable capacitor that has a variable capacitance;
a current detector that measures current output from the charge accumulation unit;
a load connection terminal connectable to a load that is operated by current output from the current detector; and
a controller that controls the variable resistance of the variable resistor, in accordance with the frequency measured by the frequency detector and the current measured by the current detector, wherein
the variable resistor is directly connected to the current detector, and
the current detector is directly connected to the load connection terminal.

2. The power supply device according to claim 1, wherein the power input terminal is connectable to a commercial power supply and an AC power supply having a frequency different from a frequency of the commercial power supply.

3. The power supply device according to claim 1, wherein the power input terminal receives AC power from a renewable energy generator.

4. A method of controlling a power supply device connectable to an alternating current (AC) power supply that fluctuates in power supply frequency and a load, the method comprising:
applying an AC voltage of the AC power supply;
rectifying the AC voltage by a rectifier;
measuring a frequency of the rectifier;
regulating current output from the rectifier by a variable resistor, the variable resistor having a variable resistance;
accumulating charge output from the variable resistor in a charge accumulation unit, the charge accumulation unit including a variable capacitor that has a variable capacitance;
measuring current output from the charge accumulation unit; and
controlling at least the variable resistance of the variable resistor, in accordance with the measured frequency of the rectifier and the measured current output from the charge accumulation unit, wherein
the variable resistor is directly connected to the current detector, and
the current detector is directly connected to the load connection terminal.

5. The power supply device according to claim 1, wherein the controller controls at least the variable resistance of the variable resistor, in accordance with a fluctuation of the frequency measured by the frequency detector, in such a manner that the current output from the charge accumulation unit becomes larger than a current consumed by the load.

6. The power supply device according to claim 1, wherein the controller controls both of (i) the variable resistance of the variable resistor and (ii) the variable capacitance of the variable capacitor included in the charge accumulation unit, in accordance with the frequency measured by the frequency detector and the current measured by the current detector.

7. The method according to claim 4, wherein the power supply device is connectable to a commercial power supply and an AC power supply having a frequency different from a frequency of the commercial power supply.

8. The method according to claim 4, wherein the power supply device receives AC power from a renewable energy generator.

9. The method according to claim 4, wherein
the controlling including controlling at least the variable resistance of the variable resistor, in accordance with a fluctuation of the measured frequency of the rectifier, in such a manner that the current output from the charge accumulation unit becomes larger than a current consumed by the load.

10. The method according to claim 4, wherein
the controlling including controlling both of (i) the variable resistance of the variable resistor and (ii) the variable capacitance of the variable capacitor included in the charge accumulation unit, in accordance with the measured frequency of the rectifier and the measured current output from the charge accumulation unit.

* * * * *